US010122734B2

(12) United States Patent
Albisu et al.

(10) Patent No.: US 10,122,734 B2
(45) Date of Patent: Nov. 6, 2018

(54) SECURE EMAIL VERIFICATION SERVICE

(71) Applicant: AT&T Intellectual Property I, L.P., Atlanta, GA (US)

(72) Inventors: Luis F. Albisu, Woodbridge, VA (US); James Alaimo, Bridgewater, NJ (US); Anthony Tortorici, Wake Forest, NC (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 125 days.

(21) Appl. No.: 15/363,422

(22) Filed: Nov. 29, 2016

(65) Prior Publication Data
US 2018/0152461 A1 May 31, 2018

(51) Int. Cl.
*H04L 29/06* (2006.01)
*H04L 12/58* (2006.01)

(52) U.S. Cl.
CPC ............ *H04L 63/123* (2013.01); *H04L 51/04* (2013.01); *H04L 51/12* (2013.01); *H04L 63/14* (2013.01)

(58) Field of Classification Search
CPC ....... H04L 63/123; H04L 63/12; H04L 51/04; H04L 51/12; H04L 63/14; G06F 21/606; G06F 21/60; G06F 21/602; G06F 21/31
USPC .......................................................... 726/22
See application file for complete search history.

(56) References Cited

U.S. PATENT DOCUMENTS

| 7,437,558 | B2 | 10/2008 | Fenton et al. |
| 7,493,661 | B2 | 2/2009 | Liu et al. |
| 7,644,274 | B1 | 1/2010 | Jakobsson et al. |
| 7,660,861 | B2 * | 2/2010 | Taylor ................. H04L 51/12 380/44 |
| 8,032,751 | B2 * | 10/2011 | Avritch ............... G06Q 10/107 709/203 |
| 8,145,718 | B1 | 3/2012 | Kacker et al. |

(Continued)

FOREIGN PATENT DOCUMENTS

| GB | 2365160 | 2/2002 |
| JP | 2005101883 | 4/2005 |
| WO | WO 2012/007322 | 1/2012 |

OTHER PUBLICATIONS

Joswin et al., "Effective Watermarking Techniques on Structured Datasets," International Journal of Science and Research, Oct. 2015, vol. 4, Issue 10, pp. 2153-2156.

(Continued)

*Primary Examiner* — Yogesh Paliwal
(74) *Attorney, Agent, or Firm* — Hartman & Citrin LLC

(57) ABSTRACT

Concepts and technologies are disclosed herein for providing and using a secure email verification service. A processor can receive verification data and identify a user identifier associated with a sender identifier included in the verification data. The processor can generate a hash value of the user identifier, a global time indicator, and message-specific data; and send the hash value to the sender device. The processor can receive a verification package that comprises the hash value and a recipient device version of the verification data and generate a new hash value of the user identifier and the recipient device version of the verification data. The processor can compare the new hash value to the hash value to determine if the email message should be verified.

20 Claims, 7 Drawing Sheets

(56) References Cited

U.S. PATENT DOCUMENTS

| | | | |
|---|---|---|---|
| 8,255,983 B2* | 8/2012 | Schultz | H04L 63/083 713/155 |
| 8,341,023 B2 | 12/2012 | Benisti et al. | |
| 8,385,887 B2 | 2/2013 | Brown et al. | |
| 8,423,758 B2 | 4/2013 | Singhal | |
| 8,429,233 B2 | 4/2013 | Sell | |
| 8,538,028 B2 | 9/2013 | Yeap et al. | |
| 8,688,790 B2 | 4/2014 | LeVasseur et al. | |
| 8,782,415 B2* | 7/2014 | Tomkow | H04L 51/30 709/206 |
| 9,075,978 B2 | 7/2015 | Schneider et al. | |
| 9,398,009 B2 | 7/2016 | Mun | |
| 2006/0031315 A1* | 2/2006 | Fenton | H04L 51/12 709/206 |
| 2006/0123476 A1 | 6/2006 | Yaghmour | |
| 2008/0244009 A1 | 10/2008 | Rand et al. | |
| 2008/0270545 A1 | 10/2008 | Howe | |
| 2009/0259840 A1* | 10/2009 | Campbell | G07B 17/00733 713/155 |
| 2012/0066498 A1* | 3/2012 | Engert | G06F 21/51 713/170 |
| 2013/0160092 A1 | 6/2013 | Benisti et al. | |
| 2015/0089217 A1 | 3/2015 | Romanik et al. | |
| 2016/0234025 A1 | 8/2016 | Tomkow | |

OTHER PUBLICATIONS

Kumari et al., "Security and Implementations of Three Level Security System," International Journal of Applied Engineering Research, 2015, vol. 10, No. 64, pp. 263-268.

Abadi et al., "Computer-Assisted Verification of a Protocol for Certified Email," 10$^{th}$ International Static Analysis Symposium, Jun. 11-13, 2003.

Garriss et al., "Re: Reliable Email," Proceedings of the 3$^{rd}$ Symposium on Networked Systems Design and Implementation, May 8-10, 2006.

Patsakis et al., "Distributing privacy policies over multimedia content across multiple online social networks," Computer Networks, Dec. 24, 2014, vol. 75, Part B, pp. 531-543.

\* cited by examiner

SECURE EMAIL VERIFICATION SERVICE

BACKGROUND

With the proliferation of email communications has come a proliferation in the amount of unsolicited and unwanted email messages. Unsolicited bulk email ("UBE"), which also is referred to as "SPAM" makes up a huge amount of network traffic worldwide. According to some estimates, close to 100 billion unsolicited and/or unwanted SPAM messages were sent on average per day in 2013. Although some studies indicate that the incidence of SPAM messages has since declined, SPAM messages continue to account for a large amount of network traffic. Also, SPAM messages often are the source of malware such as adware, viruses, and the like, which can adversely impact computer users and/or consume additional networking and computing resources.

Various approaches have been introduced over the years to attempt to reduce the amount of SPAM messages sent and/or received by users. The use of keys has been used to ensure that a sender or recipient have a trust relationship, though this requires a sender and recipient to exchange keys with one another. Some other approaches to avoiding SPAM have relied on various algorithms for identifying probable SPAM messages, though these algorithms often are not foolproof and can result in blocked legitimate messages. Some other approaches limit the amount of messages that can be sent or received by users, though these approaches also can impact legitimate email communications.

SUMMARY

The present disclosure is directed to providing and using a secure email verification service. A user or other entity such as a user associated with a sender device that sends an email message can register for an email verification service such as an email verification service that is provided by a secure email verification service hosted and/or executed by a server computer. The secure email verification service can create a user identifier for the user or device and store the user identifier at a user database. The user identifier can include a unique identifier that identifies the user, device, or application, and may not be known by the user, the sender device, and/or the email application that will be used to send email messages. In various embodiments, the secure email verification service can store the user identifier with data such as a sender identifier that identifies the user, the sender device, and/or the email application.

When a request to send an email message is detected by the sender device or the email application, the email application can capture verification data. The verification data can include data obtained from the message and can include at least a sender identifier that identifies the sender, a global time indicator that indicates a time at which the send request is detected, and a message-specific data such as the subject line of the email message. The verification data can include additional information, if desired. The sender device can send the verification data to the secure email verification service. The secure email verification service can use the sender identifier to identify the user identifier, and the secure email verification service can generate a hash of the user identifier, the global time indicator, the message-specific data, and/or other data to obtain a hash value. The hash value can be sent by the secure email verification service to the sender device, and the sender device can include the hash value in the email message as the email message is being sent. It can be appreciated that although the hash value is added to the email message, the global time indicator can be set before adding the hash value to the email message, and that the global time indicator associated with the email message is not updated when the hash value is added to the email message.

A recipient device can receive the email message and provide a verification package to the secure email verification service. The verification package can include the hash value and a recipient device version of verification data. The recipient device version of verification data can be created by the recipient device based on the email message. The recipient device version of verification data can include at least the sender identifier, the global time indicator, and the message-specific data. The secure email verification service can again identify the user identifier based on the sender identifier, and create a new hash value by hashing the user identifier, the global time indicator, and the message-specific data (and/or other data if used). The secure email verification service can compare the new hash value to the hash value and determine, based on the comparing, if the email message is authentic, verified, or the like.

According to one aspect of the concepts and technologies disclosed herein, a device is disclosed. The device can include a processor and a memory. The memory can store computer-executable instructions that, when executed by the processor, cause the processor to perform operations. The operations can include receiving, from a sender device that is used to send an email message, verification data including a sender identifier, a global time indicator, and message-specific data associated with the email message. The operations also can include identifying a user identifier associated with the sender identifier; generating a hash value of the user identifier, the global time indicator, and the message-specific data; and sending the hash value to the sender device. The sender device can include the hash value in the email message when the email message is sent. The operations also can include receiving, from a recipient device that receives the email message, a verification package that can include the hash value and a recipient device version of the verification data; identifying a user identifier associated with the sender identifier indicated by the recipient device version of the verification data; and generating a new hash value of the user identifier, a recipient global time indicator included in the email message received by the recipient device, and recipient message-specific data included in the email message received by the recipient device. The operations also can include comparing the new hash value to the hash value to determine if the email message should be verified. The user identifier is not known by the sender device or by the recipient device.

In some embodiments, the message-specific data can include a subject line associated with the email message. In some embodiments, the sender device can include the hash value in the email message when sending the email message. In some embodiments, the sender device inserts the hash value as a header for the email message before sending the email message. In some embodiments, the global time indicator indicates a time at which a command to send the email message was detected by the sender device. In some embodiments, the computer-executable instructions, when executed by the processor, can cause the processor to perform operations that further can include sending, directed to the recipient device, a verification decision that indicates if the email message is verified.

In some embodiments, the computer-executable instructions, when executed by the processor, can cause the processor to perform operations that further can include determining, based on the comparing, that the email message should not be verified; and modifying a filter in response to determining that the email message should not be verified. In some embodiments, the sender device adds the hash value to the email message. The global time indicator is not updated when the sender device adds the hash value to the email message.

According to another aspect of the concepts and technologies disclosed herein, a computer storage medium is disclosed. The computer storage medium can store computer-executable instructions that, when executed by a processor, cause the processor to perform operations. The operations can include receiving, from a sender device that is used to send an email message, verification data including a sender identifier, a global time indicator, and message-specific data associated with the email message. The operations also can include identifying a user identifier associated with the sender identifier; generating a hash value of the user identifier, the global time indicator, and the message-specific data; and sending the hash value to the sender device. The sender device can include the hash value in the email message when the email message is sent. The operations also can include receiving, from a recipient device that receives the email message, a verification package that can include the hash value and a recipient device version of the verification data; identifying a user identifier associated with the sender identifier indicated by the recipient device version of the verification data; and generating a new hash value of the user identifier, a recipient global time indicator included in the email message received by the recipient device, and recipient message-specific data included in the email message received by the recipient device. The operations also can include comparing the new hash value to the hash value to determine if the email message should be verified. The user identifier is not known by the sender device or by the recipient device.

In some embodiments, the message-specific data can include a subject line associated with the email message. In some embodiments, the sender device can include the hash value in the email message when sending the email message. In some embodiments, the sender device inserts the hash value as a header for the email message before sending the email message. In some embodiments, the global time indicator indicates a time at which a command to send the email message was detected by the sender device. In some embodiments, the computer-executable instructions, when executed by the processor, can cause the processor to perform operations that further can include determining, based on the comparing, that the email message should not be verified; and modifying a filter in response to determining that the email message should not be verified.

According to yet another aspect, a method is disclosed. The method can include receiving, by a processor that executes a secure email verification service and from a sender device that is used to send an email message, verification data including a sender identifier, a global time indicator, and message-specific data associated with the email message; identifying, by the processor, a user identifier associated with the sender identifier; generating, by the processor, a hash value of the user identifier, the global time indicator, and the message-specific data; and sending, by the processor, the hash value to the sender device. The sender device can include the hash value in the email message when the email message is sent. The method also can include receiving, by the processor and from a recipient device that receives the email message, a verification package that can include the hash value and a recipient device version of the verification data; identifying, by the processor, a user identifier associated with the sender identifier indicated by the recipient device version of the verification data; generating, by the processor, a new hash value of the user identifier, a recipient global time indicator included in the email message received by the recipient device, and recipient message-specific data included in the email message received by the recipient device; and comparing, by the processor, the new hash value to the hash value to determine if the email message should be verified. The user identifier is not known by the sender device or by the recipient device.

In some embodiments, the message-specific data can include a subject line associated with the email message. In some embodiments, the sender device can include the hash value in the email message when sending the email message. In some embodiments, the global time indicator indicates a time at which a command to send the email message was detected by the sender device. In some embodiments, the method also can include determining, based on the comparing, that the email message should not be verified; and modifying a filter in response to determining that the email message should not be verified. In some embodiments, the sender device adds the hash value to the email message. The global time indicator is not updated when the sender device adds the hash value to the email message.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
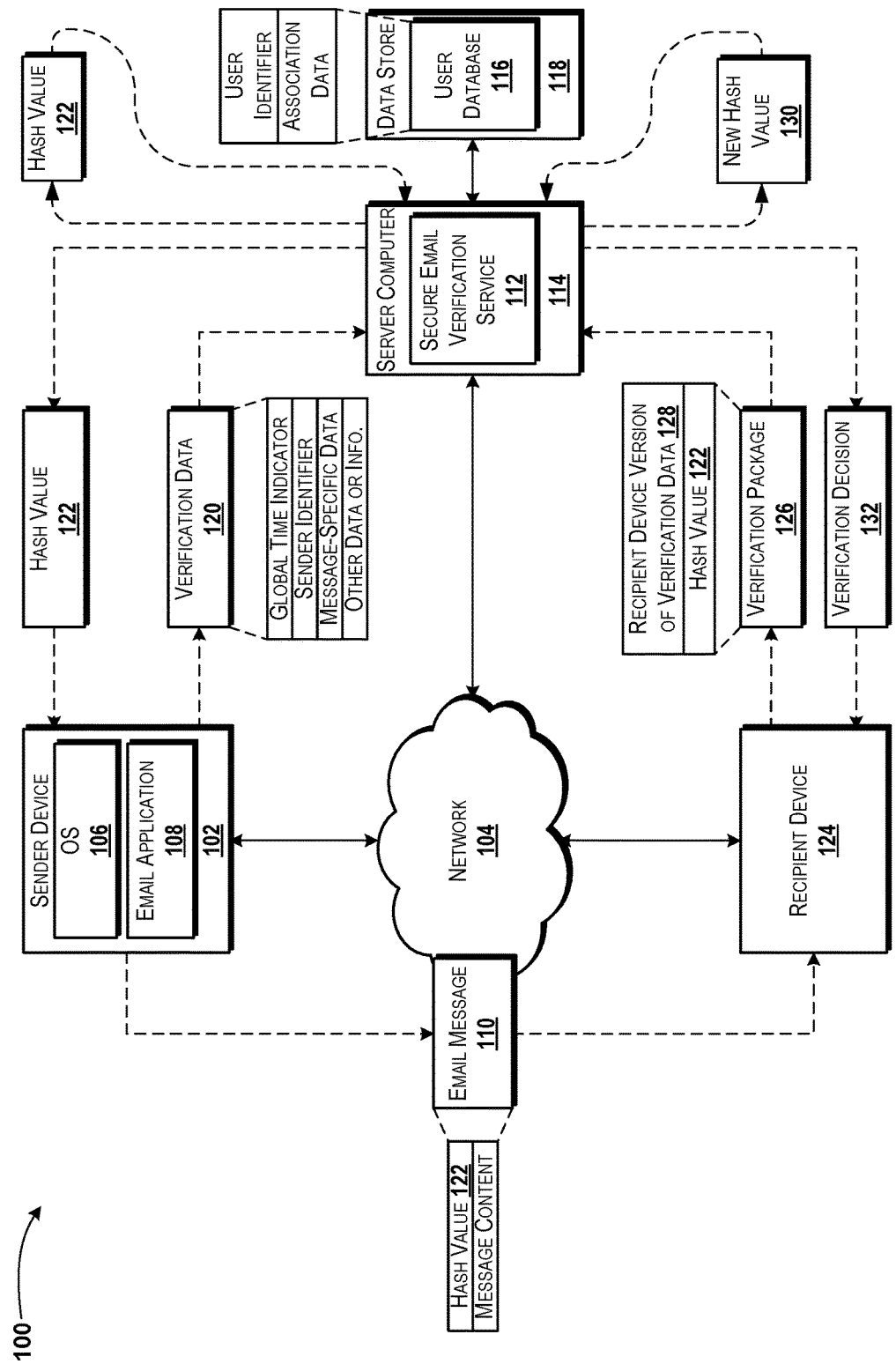
FIG. 1 is a system diagram illustrating an illustrative operating environment for various embodiments of the concepts and technologies described herein.

The following detailed description is directed to providing and using a secure email verification service. A user or other entity such as a user associated with a sender device that sends an email message can register for an email verification service such as an email verification service that is provided by a secure email verification service hosted and/or executed by a server computer. The secure email verification service can create a user identifier for the user or device and store the user identifier at a user database. The user identifier can include a unique identifier that identifies the user, device, or application, and may not be known by the user, the sender device, and/or the email application that will be used to send email messages. In various embodiments, the secure email verification service can store the user identifier with data such as a sender identifier that identifies the user, the sender device, and/or the email application.

When a request to send an email message is detected by the sender device or the email application, the email application can capture verification data. The verification data can include data obtained from the message and can include at least a sender identifier that identifies the sender, a global time indicator that indicates a time at which the send request is detected, and a message-specific data such as the subject line of the email message. The verification data can include additional information, if desired. The sender device can send the verification data to the secure email verification service. The secure email verification service can use the sender identifier to identify the user identifier, and the secure email verification service can generate a hash of the user identifier, the global time indicator, the message-specific data, and/or other data to obtain a hash value. The hash value can be sent by the secure email verification service to the sender device, and the sender device can include the hash value in the email message as the email message is being sent. It can be appreciated that although the hash value is added to the email message, the global time indicator can be set before adding the hash value to the email message, and that the global time indicator associated with the email message is not updated when the hash value is added to the email message.

A recipient device can receive the email message and provide a verification package to the secure email verification service. The verification package can include the hash value and a recipient device version of verification data. The recipient device version of verification data can be created by the recipient device based on the email message. The recipient device version of verification data can include at least the sender identifier, the global time indicator, and the message-specific data. The secure email verification service can again identify the user identifier based on the sender identifier, and create a new hash value by hashing the user identifier, the global time indicator, and the message-specific data (and/or other data if used). The secure email verification service can compare the new hash value to the hash value and determine, based on the comparing, if the email message is authentic, verified, or the like. These and other aspects of the concepts and technologies disclosed herein will be illustrated and described in more detail below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and using a secure email verification service will be described, according to an illustrative embodiment. The operating environment 100 shown in FIG. 1 includes a sender device 102. The sender device 102 can operate in communication with and/or as part of a communications network ("network") 104, though this is not necessarily the case.

According to various embodiments, the functionality of the sender device 102 may be provided by one or more desktop computers, mobile telephones, smartphones, laptop computers, tablet computers, server computers, set-top boxes, other computing systems, and the like. It should be understood that the functionality of the sender device 102 can be provided by a single device, by two similar devices, and/or by two or more dissimilar devices. For purposes of describing the concepts and technologies disclosed herein, the sender device 102 is described herein as a user device such as a personal computer. It should be understood that this embodiment is illustrative, and should not be construed as being limiting in any way.

The sender device 102 can execute an operating system 106 and one or more application programs such as, for example, an email application 108. The operating system 106 can include a computer program that can be executed to control the operation of the sender device 102. The email application 108 can include an executable program that can be configured to execute on top of the operating system 106 to provide various functions as illustrated and described herein. It should be understood that the functionality illustrated and described herein with respect to the email application 108 can be provided by a plugin, an add-on, an extension, or other functionality that can supplement and/or compliment functionality of another program. Thus, while the email application 108 is described as an email application, it should be understood that the email application 108 illustrated and described herein can supplement, compliment, or otherwise interact with other email, messaging, and/or other productivity applications, as well as web browsers applications or other standalone applications in addition to, or instead of, the illustrated email application 108. As such, the illustrated embodiment should be understood as being illustrative and should not be construed as being limiting in any way.

The email application 108 can be configured to provide functionality for creating, editing, receiving, and/or sending one or more email message 110. As is generally understood, the email message 110 can include one or more headers, message content, attachments, and/or other data. According to various embodiments of the concepts and technologies disclosed herein, the email application 108 can be configured to enable and/or support creation of the email message 110 and/or various communications required to send or receive email messages such as the email message 110. When the email application 108 detects a command to send the email message 110, the email application 108 can be configured to capture specific information associated with the sender device 102, a user associated with the sender device 102, the email application 108, or other types of information, and to use that information to allow secure email verification as illustrated and described herein.

In particular, a user or other entity associated with the sender device 102 can setup an account with a secure email verification service 112 or other service (hereinafter collectively and/or generically referred to as the "secure email verification service 112"), which can be hosted and/or executed by a computing device such as a server computer 114. The secure email verification service 112 can use various methods to identify the sender device 102 and/or a user or other entity associated with the sender device 102, and to create a unique user identifier (hereinafter referred to as a "user identifier") associated with the user or other entity and/or the sender device 102. The user identifier can be stored in a user database 116 with other data that can be used to associate the user identifier with a particular user or other entity, device (e.g., the sender device 102), or the like. In particular, the user identifier can be stored with data that associates the user identifier with a particular sender identifier, which can include a name, login, or other identifying information associated with the sender device 102, the email application 108, a user or other entity associated with the sender device 102, or the like. According to the concepts and technologies disclosed herein, the user or other entity associated with the sender device 102 (and therefore associated with the user identifier) does not have access to the user identifier. Rather, the user identifier can be stored at the user database 116 and may not be accessible to the sender device 102 and/or other entities as will be illustrated and described in more detail below.

According to various embodiments, the user database 116 can be stored and/or hosted by a data store 118. The functionality of the data store 118 can be provided by one or more database, one or more server computer, one or more desktop computer, one or more mobile telephone, one or more laptop computer, one or more other computing system, combinations thereof, or the like. In the described embodiments, the functionality of the data store 118 is described as being provided by a data server. It should be understood that this example is illustrative, and therefore should not be construed as being limiting in any way.

The secure email verification service 112 also can be configured to obtain verification data 120 from the sender device 102 when the email message 110 is sent (or as the email message 110 is being sent) to provide various functionality illustrated and described herein for secure email verification. In particular, according to various embodiments of the concepts and technologies disclosed herein, the email application 108 can be configured to capture the verification data 120 when a command to send the email message 110 is detected. According to various embodiments of the concepts and technologies disclosed herein, the verification data 120 can include a sender identifier associated with the sender device 102 (and/or the email application 108), a global time indicator, message-specific data, and/or other data or information.

The sender identifier can include a string of text or other data that can identify an entity associated with the sender device 102 and/or the email application 108. According to various embodiments, the sender identifier can include an email address, an IP address, a user login, a name, or other identifying information that can be unique to a user or other entity associated with the sender device 102. The sender identifier can be known to the sender device 102 and/or the email application 108. According to various embodiments of the concepts and technologies disclosed herein, the sender identifier can be associated with the user identifier by the secure email verification service 112 and stored with data associating the sender identifier and the user identifier at the user database 116. Thus, as noted above, the sender identifier can be known to the sender device 102 and/or the email application 108, but the user identifier is not known by the sender device 102 and/or the email application 108. Thus, the sender identifier includes any data that identifies (uniquely) a user or other entity associated with the sender device 102 and/or the email application 108 and, by extension, uniquely identifies a sender of the email message 110. It should be understood that this example is illustrative, and therefore should not be construed as being limiting in any way.

The global time indicator can include any data that identifies the moment the email message 110 is sent. According to various embodiments of the concepts and technologies disclosed herein, the global time indicator can be captured at a moment at which the command to send the email message 110 is detected and not at a moment at which the email message 110 is actually sent. According to various embodiments of the concepts and technologies disclosed herein, the global time indicator comprises time information (e.g., time data) that is captured at the moment a send request (for the email message 110) is detected. The global time indicator can include time data that is not changeable and/or that is not alterable. Therefore, the global time indicator can include reliable data that is not alterable and can be used as part of the secure email verification functionality illustrated and described herein.

The message-specific data can include another portion of data or information that can relate to the message and/or the message content associated with the email message 110 being sent. According to various embodiments of the concepts and technologies disclosed herein, the message-specific data includes a subject line associated with the message. It can be appreciated that the message-specific data, as well as the global time indicator and the sender identifier, can all reflect data or other information that can be, and should be, captured by both the sender device 102 and a recipient of the email message 110, as will be illustrated and described in more detail below, and that unless the message has been altered, these three data points should match when the email message 110 is sent and when the email message 110 is received.

The other data or information can include any other data associated with the email message 110. According to various embodiments of the concepts and technologies disclosed herein, the other data or information can include a first line of text included in the email message 110, a last line of text included in the email message 110, an nth character included in the email message 110, a string included in the email message 110 at a specified point, combinations thereof, or the like. The specification of what data is captured as the verification data 120 can be specified by configurations, settings, or the like, and communicated to the sender device 102 and a recipient of the email message 110 as will be illustrated and described in more detail below.

The secure email verification service 112 can be configured to receive the verification data 120 from the sender device 102 and to perform one or more hash operations on the verification data 120 to provide secure email verification as illustrated and described herein. In particular, the secure email verification service 112 can be configured to use the sender identifier included in the verification data 120 to identify the user identifier stored in the user database 116. As noted above, the user identifier may not be known to any entity other than the user database 116 and the secure email verification service 112.

The secure email verification service 112 can create and/or compute a hash value 122 of the user identifier (retrieved from the user database 116 using the sender identifier included in the verification data 120), the global time indicator (included in the verification data 120), and one or more other data points such as, for example, the message-specific data and/or the other data or information included in the verification data 120. According to various embodiments of the concepts and technologies disclosed herein, the secure email verification service 112 creates the hash value 122 by hashing the user identifier with the global time indicator and a subject line of the email message 110. It should be understood that this example is illustrative, and therefore should not be construed as being limiting in any way.

According to various embodiments of the concepts and technologies disclosed herein, the secure email verification service 112 does not store the hash value 122. Rather, the secure email verification service 112 returns the hash value 122 to the sender device 102, and the sender device 102 embeds the hash value 122 in the email message 110. The email message 110 is then sent to a recipient, for example the recipient device 124. Thus, it can be appreciated that the email message 110 received by the recipient device 124 can include message content and the hash value 122. Of course, the email message 110 received by the recipient device 124 also includes the sender identifier, the global time indicator, the message-specific data, and the other data or information (if used to provide the functionality illustrated and described herein).

Although not shown in FIG. 1, it should be understood that the recipient device 124 can execute an operating system, which can be, but is not necessarily, substantially identical to the operating system 106 illustrated and described with respect to the sender device 102. The recipient device 124 also can execute an email application, which can be, but is not necessarily, substantially identical to the email application 108 illustrated and described with respect to the sender device 102. Thus, it can be appreciated that the recipient device 124 and the sender device 102 can send and/or receive email messages such as the email message 110 according to various embodiments of the concepts and technologies disclosed herein.

The recipient device 124 can; via execution of an application program, extension, plugin, add-on, or the like, which can include an application that is similar or even identical to the email application 108 illustrated and described herein; identify the verification data 120 that was used to create the hash value 122. In some embodiments, the recipient device 124 may know what data is used to create the hash value 122 based on information propagated to the recipient device 124 by the secure email verification service 112, the sender device 102, and/or via configuration data, settings, or the like. In some other embodiments, the email message 110 can include data that identifies what information is used to create the hash value 122. Regardless of how this information is communicated to the recipient device 124, the recipient device 124 can be configured to create a verification package 126.

The verification package 126 can include the hash value 122 provided to the recipient device 124 as part of, or accompanying, the email message 110. The verification package 126 also can include a recipient device version of verification data 128. It must be understood that the recipient device version of verification data 128 that is included as part of the verification package 126 can be identified and added to the verification package 126 by the recipient device 124. Thus, it can be appreciated that the recipient device version of verification data 128 can be obtained from the email message 110 received by the recipient device 124 and therefore is not obtained by the sender device 102. Thus, while the verification data 120 and the recipient device version of verification data 128 can be (and in fact should be) identical to one another, these data can be generated by different devices as illustrated and described herein. As noted above, some embodiments of the concepts and technologies disclosed herein include using the global time indicator, the sender identifier, and the subject line of the email message 110, all of which are data that can be known to the recipient device 124 via analysis of the email message 110. The recipient device 124 can package the recipient device version of verification data 128 and the hash value 122 as the verification package 126, and can transmit the verification package 126 to the secure email verification service 112.

The secure email verification service 112 can receive the verification package 126. The secure email verification service 112 can access the recipient device version of verification data 128 and identify, based on the recipient device version of verification data 128, a sender identifier associated with the email message 110. The secure email verification service 112 can again access the user database 116 to identify the user identifier associated with a sender of the email message 110. The secure email verification service 112 can create a new hash value ("new hash") 130, which can correspond to a hash of the user identifier (retrieved from the user database 116 using the sender identifier included in the recipient device version of verification data 128), the global time indicator (included in the recipient device version of verification data 128), and one or more other data points such as, for example, the message-specific data and/or the other data or information included in the recipient device version of verification data 128. According to various embodiments of the concepts and technologies disclosed herein, the secure email verification service 112 creates the new hash value 130 by hashing the user identifier with the global time indicator and a subject line of the email message 110. It should be understood that this example is illustrative, and therefore should not be construed as being limiting in any way.

The secure email verification service 112 can compare the new hash value 130 to the hash value 122 obtained from the recipient device 124 to determine if the new hash value 130 and the hash value 122 match one another. Thus, it can be appreciated that the secure email verification service 112 can determine, based on comparing the hash value 122 to the new hash value 130, if content of the email message 110 was changed after sending of the email message 110 as illustrated and described above. Based on the comparing, the secure email verification service 112 can issue a verification decision 132. The verification decision 132 can include any type of data that can indicate whether or not the email message 110 received by the recipient device 124 matches the email message 110 sent by the sender device 102. Thus, the secure email verification service 112 can, based on comparing the hash value 122 to the new hash value 130, can verify if the email message 110 is genuine.

According to some embodiments, the verification decision 132 can correspond to a binary indicator such as yes or no; true or false; verified or not verified; safe or unsafe; genuine or not genuine; authentic or inauthentic; or the like. Thus, various embodiments of the concepts and technologies disclosed herein can provide a simple binary output that can indicate whether or not the email message 110 received by the recipient device is safe, unsafe, genuine, or the like. Because other types of indicators can be provided as the verification decision 132 (e.g., scores, probabilities, etc.), it should be understood that this example is illustrative, and therefore should not be construed as being limiting in any way.

In practice, a user or other entity, e.g., a user associated with the sender device 102, can register for an email verification service, e.g., a service that is to be provided by the secure email verification service 112. The secure email verification service 112 can create a user identifier for the user or device and store the user identifier at a user database 116. The user identifier can include a unique identifier that identifies the user and may not be known by the user, the sender device 102, and/or the email application 108 that will be used to send email messages 110. In various embodiments, the secure email verification service 112 can store the user identifier with data, e.g., the sender identifier, which can include data that identifies the user, the sender device 102, and/or the email application 108.

When a request to send an email message 110 is detected by the sender device 102 (or the email application 108), verification data 120 can be captured by the email application 108. The verification data 120 can include at least a sender identifier that identifies the sender, a global time indicator that indicates a time at which the send request is detected, and a message-specific data such as the subject line of the email message 110. The verification data 120 can include additional information as well, as explained above. The sender device 102 can send the verification data 120 to the secure email verification service 112.

The secure email verification service 112 can use the sender identifier to identify the user identifier, and the secure email verification service 112 can generate a hash of the user identifier, the global time indicator, the message-specific data, and/or other data to obtain the hash value 122. The hash value 122 can be sent by the secure email verification service 112 to the sender device 102, and the sender device 102 can include the hash value 122 in the email message 110 as the email message 110 is being sent. It can be appreciated that although the hash value 122 is added to the email message 110, the global time indicator can be set before adding the hash value 122 to the email message 110, and that as such, the global time indicator is not updated when the hash value 122 is added to the email message 110.

A recipient device 124 can receive the email message 110 and provide a verification package 126 to the secure email verification service 112. The verification package 126 can include the hash value 122 and a recipient device version of verification data 128 that can be created by the recipient device 124 based on the email message 110. The recipient device version of verification data 128 can include at least the sender identifier, the global time indicator, and the message-specific data. The secure email verification service 112 can again identify the user identifier based on the sender identifier, and create a new hash value 130 by hashing the user identifier, the global time indicator, and the message-specific data (and/or other data if used). The secure email verification service 112 can compare the new hash value 130 to the hash value 122 and determine, based on the comparing, if the email message 110 is authentic, verified, or the like. These and other aspects of the concepts and technologies disclosed herein will be illustrated and described in more detail below.

According to various embodiments of the concepts and technologies disclosed herein, the server computer 114 (and the secure email verification service 112 hosted and/or executed thereby) can be accessed via an application programming interface ("API") exposed by the secure email verification service 112. As such, it can be appreciated that the secure email verification service 112 can be called via service call and that the server computer 114 and/or the secure email verification service 112 can therefore provide hash values 122 and/or new hash values 130 in response to receiving verification data (the verification data 120 and/or the recipient device version of verification data 128), which can therefore correspond to a service call in some embodiments. It should be understood that this example is illustrative, and therefore should not be construed as being limiting in any way.

It also can be appreciated that embodiments of the concepts and technologies disclosed herein can eliminate the need to use digital signing (e.g., with X.509 certificates), which generally requires the implementation and use of a public key infrastructure. Thus, embodiments of the concepts and technologies disclosed herein can provide an approach to verifying email messages 110 without exchanging digital certificates and/or without the use of a private key infrastructure ("PKI"). Also, embodiments of the concepts and technologies disclosed herein can help reduce or avoid reliance on complex algorithms that otherwise may be needed to detect unsolicited bulk email ("UBE," which is also referred to colloquially as "SPAM"). This can provide various advantages since some algorithms are prone to misidentifying email messages 110 as SPAM, thereby unnecessarily filtering or blocking email messages 110. It should be understood that this example is illustrative, and therefore should not be construed as being limiting in any way.

As such, it can be appreciated that the secure email verification service 112 can act as a central authority for email messages 110. It also should be understood that the user identifier illustrated and described herein can include randomly generated seed, which can be used as the hash function for generating the hash value 122 and/or the new hash value 130 illustrated and described herein. It should be understood that this example is illustrative, and therefore should not be construed as being limiting in any way.

FIG. 1 illustrates one sender device 102, one network 104, one server computer 114, one data store 118, and one recipient device 124 It should be understood, however, that various implementations of the operating environment 100 can include zero, one, or more than one sender device 102; zero, one, or more than one network 104; zero, one, or more than one server computer 114; zero, one, or more than one data store 118; and/or zero, one, or more than one recipient device 124. As such, the illustrated embodiment should be understood as being illustrative, and should not be construed as being limiting in any way.

Figure 2:
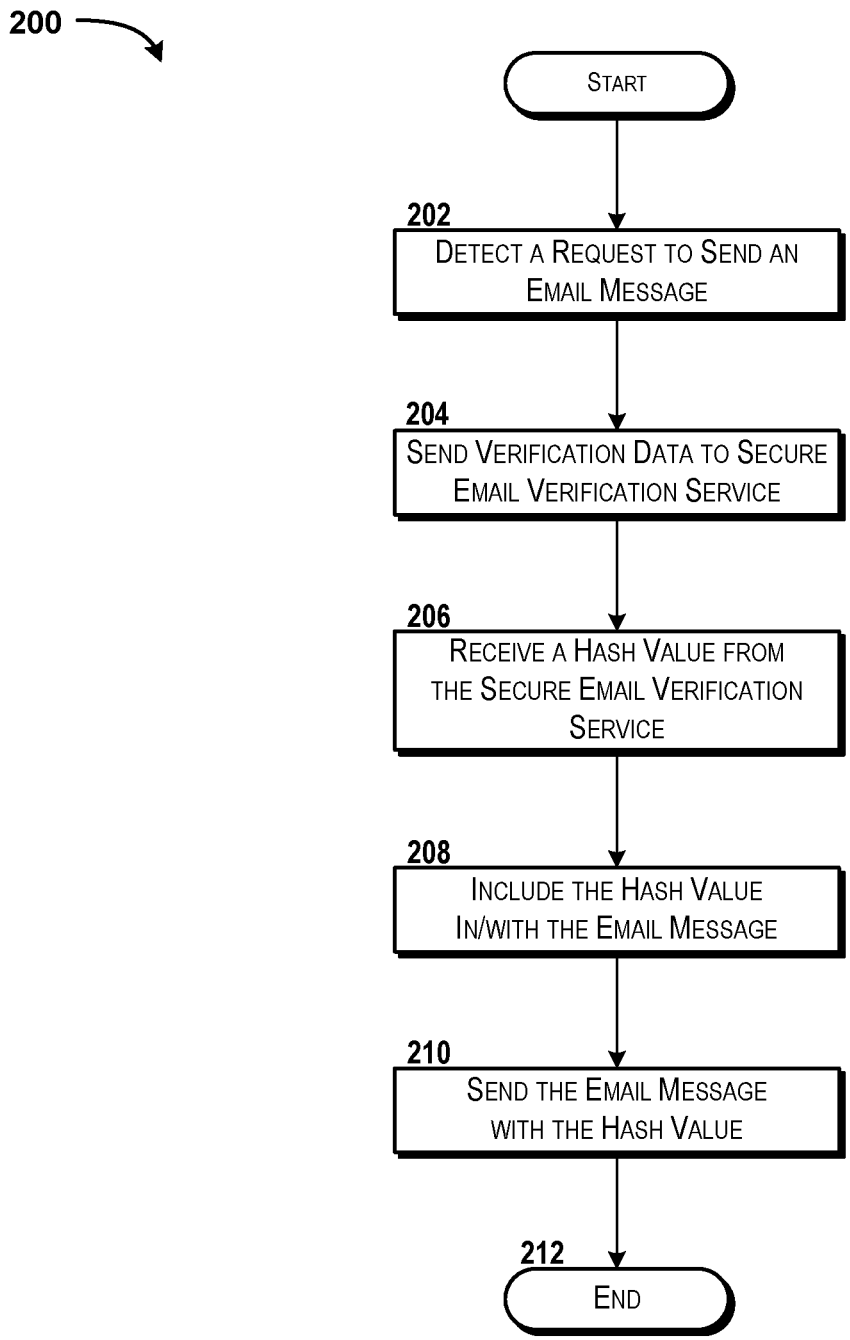
FIG. 2 is a flow diagram showing aspects of a method for sending a verifiable email message using a secure email verification service, according to an illustrative embodiment of the concepts and technologies described herein.

Turning now to FIG. 2, aspects of a method 200 for sending a verifiable email message using a secure email verification service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the sender device 102, the server computer 114, or the recipient device 124, to perform one or more operations and/or causing the processor to direct other components of the computing system or device to perform one or more of the operations.

For purposes of illustrating and describing the concepts of the present disclosure, the method 200 is described herein as being performed by the sender device 102 via execution of one or more software modules such as, for example, the email application 108. It should be understood that additional and/or alternative devices and/or network nodes can provide the functionality described herein via execution of one or more modules, applications, and/or other software including, but not limited to, the email application 108, a web browser application and/or an extension, add-on, plug-in, or the like. Thus, the illustrated embodiments are illustrative, and should not be viewed as being limiting in any way.

Although not illustrated in FIG. 2, a setup process can be performed by the sender device 102 or another device or entity to register the sender device 102 with the secure email verification service 112. The setup process can include identifying a user, entity, or the like. A sender identifier that identifies the user, entity, or the like can include, for example, data that identifies a user or other entity associated with the sender device 102, a serial number or other identifier that identifies an installation of the email application 108, or other identifier associated with the user or other entity. The secure email verification service 112 can create and/or assign a user identifier that uniquely identifies a sender for an email message 110. The user identifier can be kept secret from the sender and/or other entities. According to various embodiments, the user identifier is stored at the user database 116 by the secure email verification service 112 with data that associates the user identifier with a sender identifier. Thus, the setup process can include creating and associating a user identifier with a particular sender identifier, sender, or entity as illustrated and described herein. It should be understood that this example is illustrative, and therefore should not be construed as being limiting in any way.

The method 200 can begin at operation 202. At operation 202, the sender device 102 can detect a request to send an email message such as the email message 110. According to various embodiments, the sender device 102 can detect the request to send the email message 110 by detecting selection of an option to send the email message 110, by detecting a send command, or the like. It can be appreciated that the request to send the email message 110 can be received or detected by the sender device 102 after creation and/or editing of the email message 110. Although not shown separately in FIG. 2, it should be understood that the sender device 102 can be configured to determine a global time and/or to create a global time indicator when the request to send the email message 110 is detected in operation 202. It should be understood that this example is illustrative, and therefore should not be construed as being limiting in any way.

From operation 202, the method 200 can proceed to operation 204. At operation 204, the sender device 102 can send verification data 120 to the secure email verification service 112. The sender device 102 can capture the global time indicator, as noted above, and send the global time indicator to the secure email verification service 112 with other verification data 120. As illustrated and described herein with reference to FIG. 1, the verification data 120 can include at least the global time indicator, the sender identifier, and the message-specific data. According to various embodiments, the sender device 102 can capture the global time when the send request is detected (e.g., in operation 202), and the sender device 102 can capture, from the email message 110, the sender identifier and the message-specific data such as the subject line. It should be understood that this example is illustrative, and therefore should not be construed as being limiting in any way.

These and/or other data can be captured by the sender device 102 and sent to the secure email verification service 112. As noted above, the sender identifier can include an email address, IP address, email application serial number, or other identifying information associated with the sender device 102 and/or the email application 108. Thus, it can be appreciated that the verification data 120 can be sent to the secure email verification service 112 in any desired format by the sender device 102.

From operation 204, the method 200 can proceed to operation 206. At operation 206, the sender device 102 can receive a hash value 122 from the secure email verification service 112. As will be explained in more detail, particularly with reference to FIG. 3, the secure email verification service 112 can calculate the hash value 122 by hashing a user identifier (identified using the sender identifier) with the global time indicator and the message-specific data and send the hash value 122 to the sender device 102.

From operation 206, the method 200 can proceed to operation 208. At operation 208, the sender device 102 can embed the hash value 122 in the email message 110, add or otherwise attach the hash value 122 to the email message 110, or otherwise include the hash value 122 with the email message 110. According to various embodiments of the concepts and technologies disclosed herein, the sender device 102 can add the hash value 122 to the email message 110 by adding the hash value 122 to a header for the email message 110. As noted above, the addition of the hash value 122 to the email message 110 by the sender device 102 can be completed without modifying the sent time represented by the global time indicator.

From operation 208, the method 200 can proceed to operation 210. At operation 210, the sender device 102 can send the email message 110 or relay the email message 110 to another device, application, node, system, or the like, which can send the email message 110. It can be appreciated that the email message 110 sent in operation 210 can include the hash value 122 and/or can be sent with the hash value 122.

From operation 210, the method 200 can proceed to operation 212. The method 200 can end at operation 212.

Figure 3:
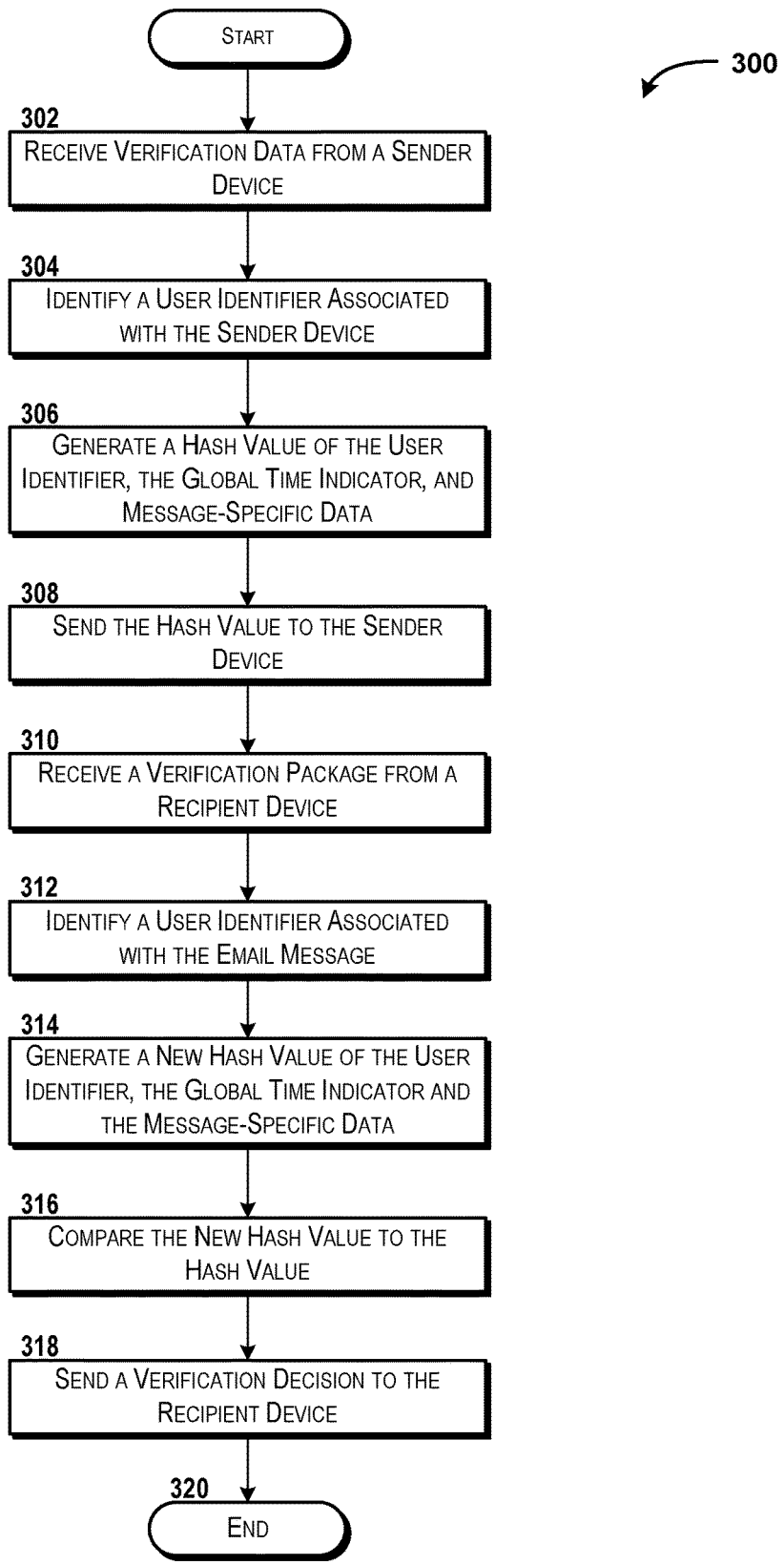
FIG. 3 is a flow diagram showing aspects of a method for providing a secure email verification service, according to an illustrative embodiment of the concepts and technologies described herein.

Turning now to FIG. 3, aspects of a method 300 for providing a secure email verification service 112 will be described in detail, according to an illustrative embodiment. For purposes of illustrating and describing the concepts of the present disclosure, the method 300 is described herein as being performed by the server computer 114 via execution of one or more software modules such as, for example, the secure email verification service 112. It should be understood that additional and/or alternative devices and/or network nodes can provide the functionality described herein via execution of one or more modules, applications, and/or other software including, but not limited to, the secure email verification service 112. Thus, the illustrated embodiments are illustrative, and should not be viewed as being limiting in any way.

As noted above with reference to FIG. 2, the server computer 114 also can perform the setup process described above to create a user identifier for a device such as the sender device 102. In particular, the server computer 114 can create and/or assign a user identifier to a user, device, or other entity. The user identifier can uniquely identify a sender such as a sender of an email message 110. The user identifier can be kept secret from the sender and/or other entities other than the server computer 114 and/or the secure email verification service 112 executed thereby. The server computer 114 can store the user identifier at the user database 116 with data that associates the user identifier with a sender identifier. It should be understood that this example is illustrative, and therefore should not be construed as being limiting in any way.

The method 300 begins at operation 302. At operation 302, the server computer 114 can receive verification data 120 from a sender device such as the sender device 102. As explained above, the verification data 120 can be received from the sender device 102 as part of sending an email message 110 by the sender device 102. It can be appreciated from the description herein, that the verification data 120 can be provided to the server computer 114 prior to sending the email message 110, but after capturing the global time (e.g., by way of the global time indicator) in response to detecting a request to send the email message 110.

As explained above, the verification data 120 can include at least a sender identifier that identifies a user or other entity, a device, and/or an application (or installation thereof) associated with the sender device 102; a global time indicator that includes data that indicates a time at which a request to send the email message 110 was detected; message-specific data that relates to the message content (e.g., the subject line of the email message 110, a string or character from the email message 110, a header of the email message 110, or the like); and/or other data included in the email message 110.

From operation 302, the method 300 can proceed to operation 304. At operation 304, the server computer 114 can identify a user identifier associated with the sender device 102. In some embodiments, the server computer 114 can identify the user identifier by determining an identity of the sender device 102. In some other embodiments, the verification data 120 can include a sender identifier associated with the sender device 102, and as such the server computer 114 can access the user database 116 to identify the user identifier based on the sender identifier. Regardless of how the user identifier is determined, it should be understood that the user identifier can include an identifier (a character string, a seed, a key, or other data) that is not known to the sender device 102, the recipient device 124, or other entities other than the server computer 114. It should be understood that this example is illustrative, and therefore should not be construed as being limiting in any way.

From operation 304, the method 300 can proceed to operation 306. At operation 306, the server computer 114 can generate a hash value such as the hash value 122. The hash value 122 can be generated in operation 306 by the server computer 114 by hashing the user identifier identified in operation 304 with the global time indicator included in the verification data 120 and the message-specific data included in the verification data 120. The hashing of this data can be completed using any desired type of hash algorithm. Regardless of how the hash value 122 is computed, it should be noted that the hash value 122 can be based on at least the above-noted three data points, namely, the user identifier, the global time indicator, and the message-specific data. Other data can be made a part of the calculated hash value 122, if desired and as explained above.

From operation 306, the method 300 can proceed to operation 308. At operation 308, the server computer 114 can send the hash value 122 to the sender device 102. Thus, it can be appreciated that the server computer 114 can provide the hash value 122 as a response to a request, wherein the receipt of the verification data 120 by the server computer 114 can be deemed a request for the hash value 122. It should be understood that this example is illustrative, and therefore should not be construed as being limiting in any way.

From operation 308, the method 300 can proceed to operation 310. At operation 310, the server computer 114 can receive a verification package 126 from a recipient device such as the recipient device 124. As explained above, the verification package 126 can include the hash value 122 generated in operation 306, as the sender device 102 can add the hash value 122 to the email message 110 sent to the recipient device 124. Additionally, the verification package 126 can include the recipient device version of verification data 128.

As explained above, the recipient device version of verification data 128 and the verification data 120 should be identical for the email message 110 since the data included in both the verification data 120 and the recipient device version of verification data 128 are both taken from the email message 110. In particular, the recipient device version of verification data 128 can include the sender identifier, the global time indicator, the message-specific data, and/or other information that may be used to provide email verification as illustrated and described herein. Unless the email message 110 has been altered after being sent by the sender device 102, the recipient version of the verification data 128 should match the verification data 120. It should be understood that this example is illustrative, and therefore should not be construed as being limiting in any way.

From operation 310, the method 300 can proceed to operation 312. At operation 312, the server computer 114 can identify a user identifier associated with the email message 110 and/or a sender of the email message 110. In some embodiments, the server computer 114 can identify the user identifier by determining an identity of the sender device 102 based on a sender identifier included in the recipient device version of verification data 128. The server computer 114 can access the user database 116 to identify the user identifier based on the sender identifier. It should be understood that this example is illustrative, and therefore should not be construed as being limiting in any way.

From operation 312, the method 300 can proceed to operation 314. At operation 314, the server computer 114 can generate a new hash value such as the new hash value 130. The new hash value 130 can be generated in operation 314 by the server computer 114 by hashing the user identifier identified in operation 312 with the global time indicator included in the recipient device version of verification data 128 and the message-specific data included in the recipient device version of verification data 128. The hashing of this data can be completed using any desired type of hash algorithm. Regardless of how the new hash value 130 is computed, it should be noted that the new hash value 130 can be based on at least the above-noted three data points, namely, the user identifier, the global time indicator, and the message-specific data. Other data can be made a part of the new hash value 130 calculated in operation 314, if desired and as explained above.

From operation 314, the method 300 can proceed to operation 316. At operation 316, the server computer 114 can compare the new hash value 130 generated in operation 314 to the hash value 122 received as part of the verification package 126. As such, it can be appreciated that the server computer 114 can compare the new hash value 130 generated in operation 314 to the hash value 122 generated in operation 306 without storing the hash value 122. If the email message 110 has not been altered between the time that the send request is detected by the sender device 102 and the time the email message 110 has been received by the recipient device 124, the hash value 122 and the new hash value 130 should be identical. If the hash value 122 and the new hash value 130 are identical, the server computer 114 can determine that the email message 110 should be verified. If the hash value 122 and the new hash value 130 are not identical, the server computer 114 can determine that the email message 110 should not be verified. It should be understood that this example is illustrative, and therefore should not be construed as being limiting in any way.

From operation 316, the method 300 can proceed to operation 318. At operation 318, the server computer 114 can send a verification decision 132 to the recipient device 124. The verification decision 132 can indicate whether or not the email message 110 should be verified and can be based on the outcome of the determination illustrated in operation 316.

Although not separately illustrated in FIG. 3, it should be understood that the server computer 114 can take other actions based on the comparing (and determination) illustrated in operation 316. In particular, if the server computer 114 determines that the email message 110 is not to be verified, the server computer 114 can update or instruct other devices or programs to update one or more filter lists, delete or instruct other devices to delete the email message 110, block senders or entities associated with the email message 110, combinations thereof, or the like. It also should be understood that the recipient device 124 can undertake various operations in response to receiving an unverified email message 110 such as, for example, blocking senders, deleting messages, updating filters, combinations thereof, or the like. Because other operations can be taken by various entities in response to a verification (or non-verification) of an email message 110, it should be understood that these examples are illustrative, and therefore should not be construed as being limiting in any way.

From operation 318, the method 300 can proceed to operation 320. The method 300 can end at operation 320.

Figure 4:
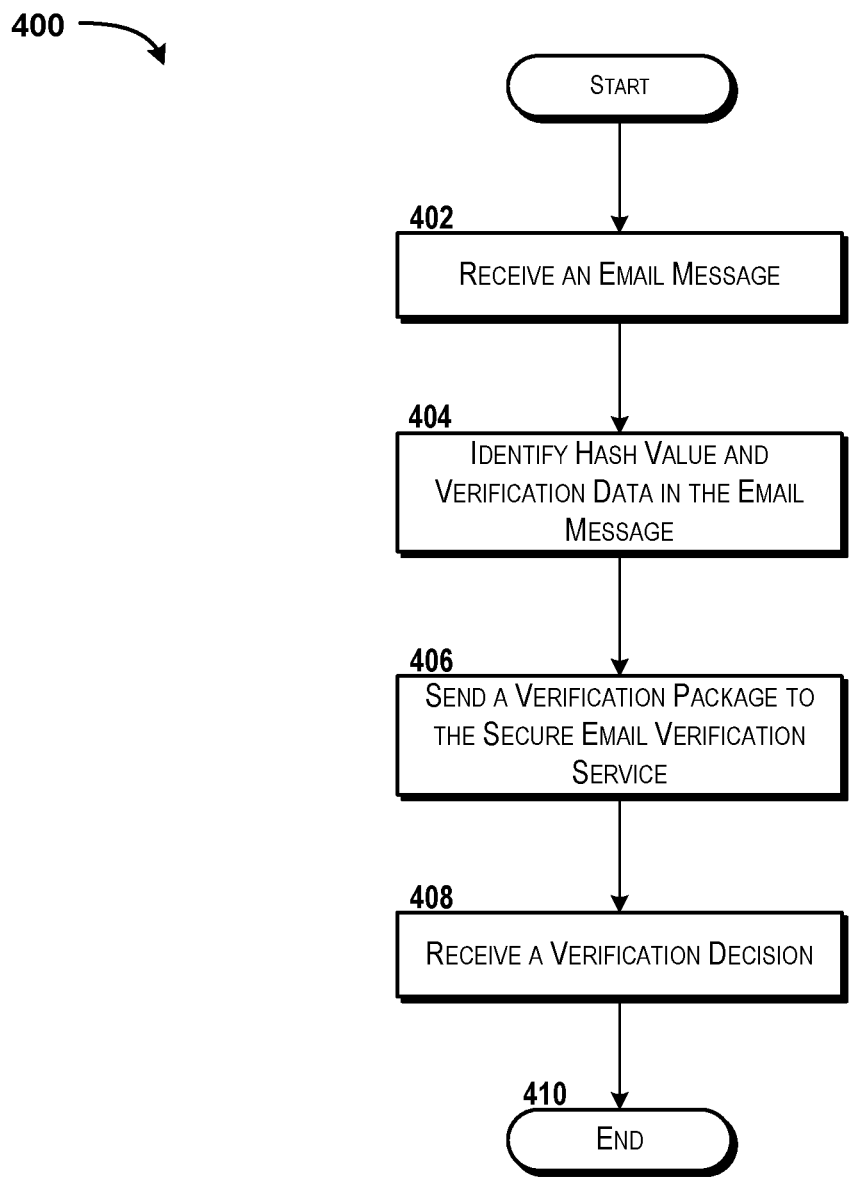
FIG. 4 is a flow diagram showing aspects of a method for verifying a received email message using a secure email verification service, according to an illustrative embodiment of the concepts and technologies described herein.

Turning now to FIG. 4, aspects of a method 400 for verifying a received email message 110 using a secure email verification service 112 will be described in detail, according to an illustrative embodiment. For purposes of illustrating and describing the concepts of the present disclosure, the method 400 is described herein as being performed by the recipient device 124 via execution of one or more software modules such as, for example, an email application such as the email application 108 illustrated and described in FIG. 1. It should be understood that additional and/or alternative devices and/or network nodes can provide the functionality described herein via execution of one or more modules, applications, and/or other software including, but not limited to, an email application, a web browser application and/or an extension, add-on, plug-in, or the like. Thus, the illustrated embodiments are illustrative, and should not be viewed as being limiting in any way.

The method 400 begins at operation 402. At operation 402, the recipient device 124 can receive an email message 110. The email message 110 can be received from a sender device 102. It can be appreciated, however, that the email message 110 may be routed through any number of networks and/or devices as generally is understood. In some embodiments, the email message 110 received in operation 402 can be received with a hash value 122. In some other embodiments, the hash value 122 can be attached to, included in, and/or otherwise made a part of the email message 110 received in operation 402. For example, in some embodiments the hash value 122 can be added to the email message 110 as a header for the email message 110. It should be understood that this example is illustrative, and therefore should not be construed as being limiting in any way.

It also should be noted that the email message 110 received in operation 402 is not hashed in its entirety. Thus, the email message 110 is received as a standard email message, but the hash value 122 can be sent with the email message 110 and/or can be included as a part of, an attachment to, a header of, or otherwise included with the email message 110.

From operation 402, the method 400 can proceed to operation 404. At operation 404, the recipient device 124 can identify the hash value 122 and verification data 120 that is to be obtained from the email message 110. In particular, if the sender device 102 used the global time indicator, the sender identifier, and the message-specific data of the email message 110 as the verification data 120 (prior to sending the email message 110), the recipient device 124 can identify the same data points in the received email message 110 and therefore can identify the sender identifier, the global time indicator, and the message-specific data as illustrated and described herein. As noted above, other data can be used at the verification data 120 by the sender device 102, and therefore additional data can be identified in operation 404 by the recipient device 124.

From operation 404, the method 400 can proceed to operation 406. At operation 406, the recipient device 124 can send a verification package 126 to the secure email verification service 112. The verification package 126 can include the hash value 122 and the recipient device version of verification data 128. The verification package 126 can be sent to the secure email verification service 112 for verification of the email message 110 as illustrated and described above with reference to FIG. 3.

From operation 406, the method 400 can proceed to operation 408. At operation 408, the recipient device 124 can receive the verification decision 132 from the secure email verification service 112. The verification decision 132 can indicate, to the recipient device 124, if the email message 110 is verified, not verified, or the like. Thus, the recipient device 124 can accept the email message 110, reject the email message 110, and/or take other actions based on the verification decision 132 received in operation 408. As noted above, the other actions can include updating filters, blocking senders, allowing senders, blocking messages, allowing messages, combinations thereof, or the like.

From operation 408, the method 400 can proceed to operation 410. The method 400 can end at operation 410.

Although not separately illustrated in FIG. 4, it should be understood that the recipient device 124 can take various actions when a verification decision 132 is received. For example, the recipient device 124 can indicate that a sender associated with an email message 110 is approved, trusted, or the like, based on receiving an indication that an email message 110 is verified. In some embodiments, a sender of an email message 110 may be added to a trusted list, verified sender list, or the like, after a certain number (e.g., three messages, five messages, ten messages, or the like) email messages 110 are received and verified. It should be understood that this example is illustrative, and therefore should not be construed as being limiting in any way. Additionally, or alternatively, a sender associated with an email message 110 may be blocked, added to a non-trusted sender list, or the like if a verification decision 132 indicates that an email message 110 is not verified. One or more actions may be taken after a single unverified email message 110 or after multiple unverified email messages 110. Thus, it should be understood that the recipient device 124 can undertake various operations in response to receiving an unverified email message 110 such as, for example, blocking senders, unblocking senders, deleting messages, updating filters, combinations thereof, or the like. Because other operations can be taken by various entities in response to a verification (or non-verification) of an email message 110, it should be understood that these examples are illustrative, and therefore should not be construed as being limiting in any way.

Figure 5:
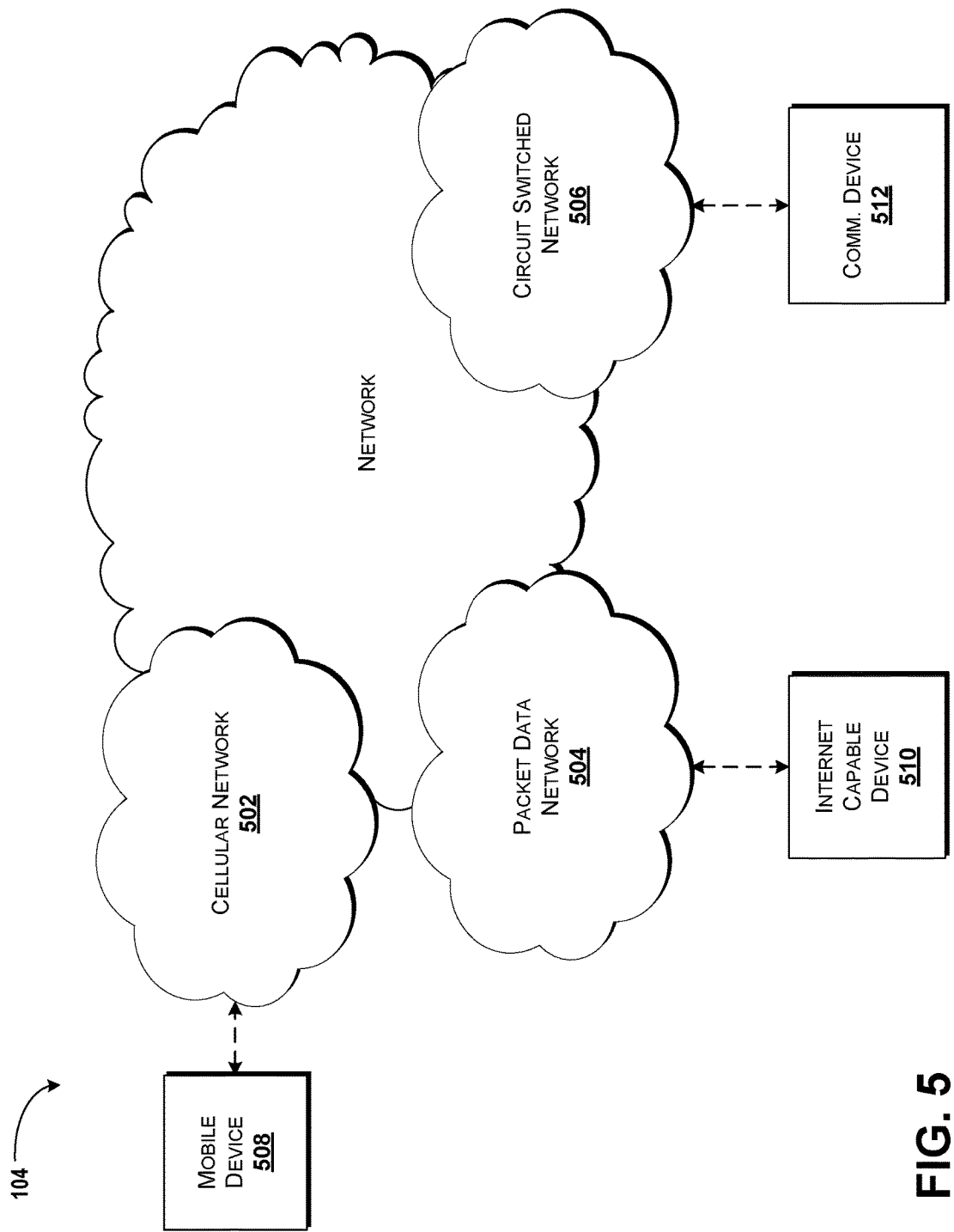
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and (in some embodiments via the circuit switched network 506 or directly) to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
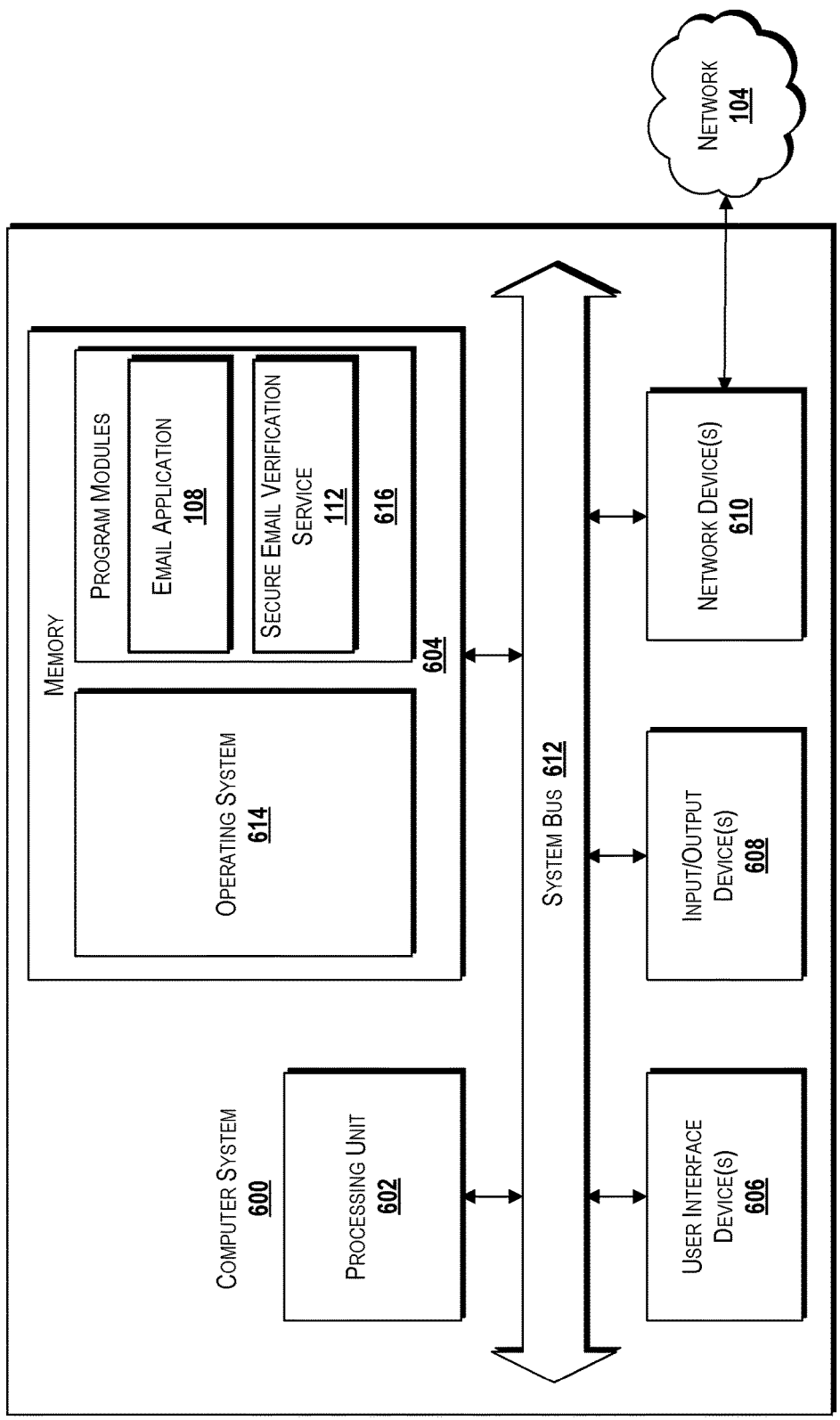
FIG. 6 is a block diagram illustrating an example computer system configured to provide and/or interact with a secure email verification service, according to some illustrative embodiments of the concepts and technologies described herein.

FIG. 6 is a block diagram illustrating a computer system 600 configured to provide the functionality described herein for providing, using, and/or interacting with a secure email verification service, in accordance with various embodiments of the concepts and technologies disclosed herein.

The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or other families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the email application 108 and/or the secure email verification service 112. These and/or other programs can be embodied in computer-readable media containing instructions that, when executed by the processing unit 602, perform one or more of the methods 200, 300, 400 described in detail above with respect to FIGS. 2-4 and/or other functionality as illustrated and described herein. It can be appreciated that, at least by virtue of the instructions embodying the methods 200, 300, 400 and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the email message 110, the verification data 120, the user database 116, the hash value 122, the verification package 126, the verification decision 132, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
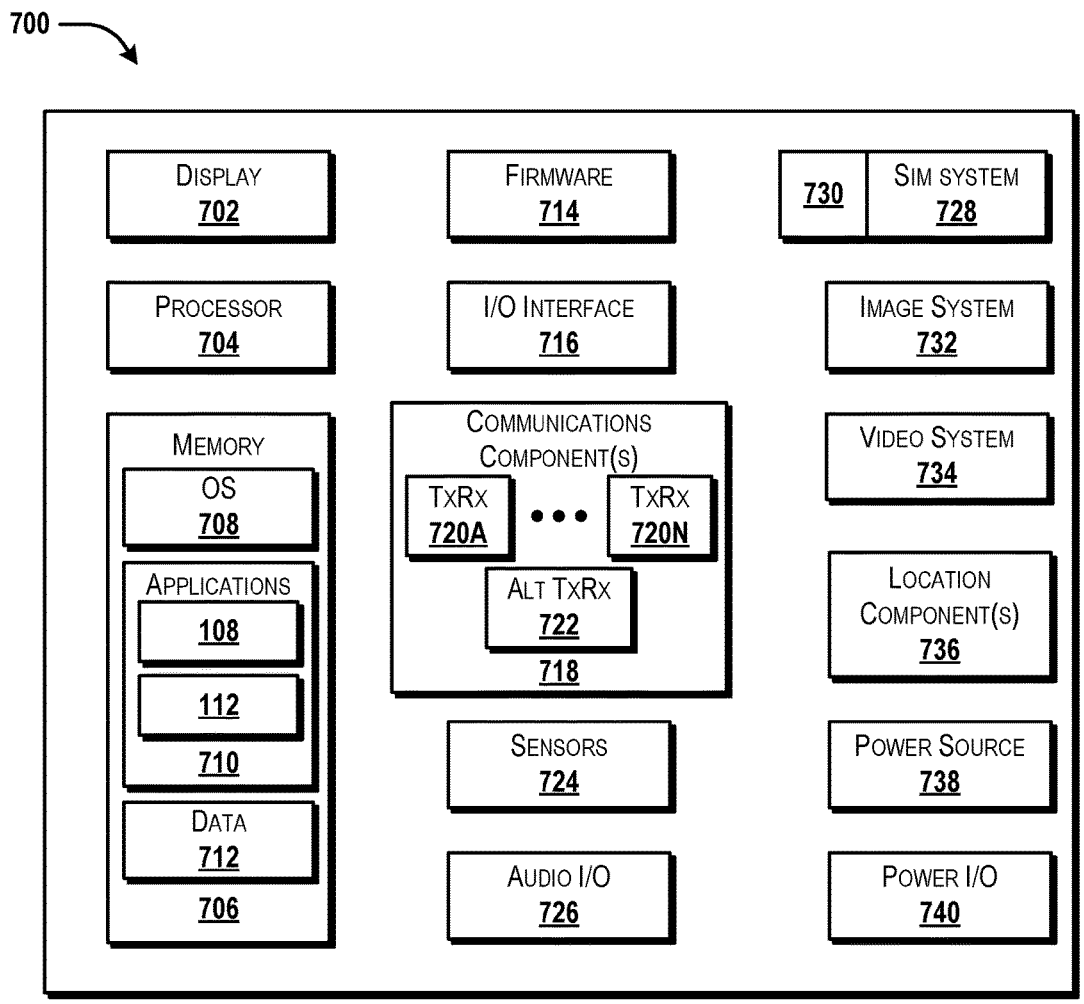
FIG. 7 is a block diagram illustrating an example mobile device configured to interact with a secure email verification service, according to some illustrative embodiments of the concepts and technologies described herein.

Turning now to FIG. 7, an illustrative mobile device 700 and components thereof will be described. In some embodiments, one or more of the sender device 102 and the recipient device 124 described above with reference to FIGS. 1-4 can be configured as and/or can have an architecture similar or identical to the mobile device 700 described herein in FIG. 7. It should be understood, however, that the sender device 102 and/or the recipient device 124 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements such as, for example, email program interfaces, text editor interfaces, productivity interfaces, web browser interfaces, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the email application 108, the secure email verification service 112, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, creating and sending email messages such as the email message 110 illustrated and described herein, viewing web content, accessing web-based email programs, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the email application 108, the secure email verification service 112, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704.

It can be appreciated that, at least by virtue of storage of the instructions corresponding to the applications 710 and/or other instructions embodying other functionality illustrated and described herein in the memory 706, and/or by virtue of the instructions corresponding to the applications 710 and/or other instructions embodying other functionality illustrated and described herein being accessed and/or executed by the processor 704, the mobile device 700 is a special-purpose mobile device that can facilitate providing the functionality illustrated and described herein. The firmware 714 also can store code for execution during device power up and power down operations. It can be appreciated that the firmware 714 can be stored in a volatile or non-volatile data storage device including, but not limited to, the memory 706 and/or a portion thereof The mobile device 700 also can include an input/output ("I/O") interface 716. The I/O interface 716 can be configured to support the input/output of data such as location information, email messages 110, the verification data 120, the user database 116, the hash value 122, the verification package 126, the verification decision 132, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/ or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for providing and using a secure email verification service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A device comprising:
a processor; and
a memory that stores computer-executable instructions that, when executed by the processor, cause the processor to perform operations comprising
receiving, from a sender device that is used to send an email message, verification data comprising a sender identifier, a global time indicator, and message-specific data associated with the email message,
identifying a user identifier associated with the sender identifier,
generating a hash value of the user identifier, the global time indicator, and the message-specific data,
sending the hash value to the sender device, wherein the sender device includes the hash value in the email message when the email message is sent,
receiving, from a recipient device that receives the email message, a verification package that comprises the hash value and a recipient device version of the verification data,
identifying a further user identifier associated with the sender identifier indicated by the recipient device version of the verification data,
generating a new hash value of the further user identifier, a recipient global time indicator included in the email message received by the recipient device, and recipient message-specific data included in the email message received by the recipient device, and
comparing the new hash value to the hash value to determine if the email message should be verified, wherein the user identifier is not known by the sender device or by the recipient device.

2. The device of claim 1, wherein the message-specific data comprises a subject line associated with the email message.

3. The device of claim 1, wherein the sender device includes the hash value in the email message when sending the email message.

4. The device of claim 3, wherein the sender device inserts the hash value as a header for the email message before sending the email message.

5. The device of claim 1, wherein the global time indicator indicates a time at which a command to send the email message was detected by the sender device.

6. The device of claim 1, wherein the computer-executable instructions, when executed by the processor, cause the processor to perform operations further comprising:
sending, directed to the recipient device, a verification decision that indicates if the email message is verified.

7. The device of claim 1, wherein the computer-executable instructions, when executed by the processor, cause the processor to perform operations further comprising:
determining, based on the comparing, that the email message should not be verified; and
modifying a filter in response to determining that the email message should not be verified.

8. The device of claim 1, wherein the sender device adds the hash value to the email message, and wherein the global time indicator is not updated when the sender device adds the hash value to the email message.

9. A computer storage medium having computer-executable instructions stored thereon that, when executed by a processor, cause the processor to perform operations comprising:
receiving, from a sender device that is used to send an email message, verification data comprising a sender identifier, a global time indicator, and message-specific data associated with the email message;
identifying a user identifier associated with the sender identifier;
generating a hash value of the user identifier, the global time indicator, and the message-specific data;
sending the hash value to the sender device, wherein the sender device includes the hash value in the email message when the email message is sent;
receiving, from a recipient device that receives the email message, a verification package that comprises the hash value and a recipient device version of the verification data;
identifying a further user identifier associated with the sender identifier indicated by the recipient device version of the verification data;
generating a new hash value of the further user identifier, a recipient global time indicator included in the email message received by the recipient device, and recipient message-specific data included in the email message received by the recipient device; and
comparing the new hash value to the hash value to determine if the email message should be verified, wherein the user identifier is not known by the sender device or by the recipient device.

10. The computer storage medium of claim 9, wherein the message-specific data comprises a subject line associated with the email message.

11. The computer storage medium of claim 9, wherein the sender device includes the hash value in the email message when sending the email message.

12. The computer storage medium of claim 11, wherein the sender device inserts the hash value as a header for the email message before sending the email message.

13. The computer storage medium of claim 9, wherein the global time indicator indicates a time at which a command to send the email message was detected by the sender device.

14. The computer storage medium of claim 9, wherein the computer-executable instructions, when executed by the processor, cause the processor to perform operations further comprising:
determining, based on the comparing, that the email message should not be verified; and
modifying a filter in response to determining that the email message should not be verified.

15. A method comprising:
receiving, by a processor that executes a secure email verification service and from a sender device that is used to send an email message, verification data comprising a sender identifier, a global time indicator, and message-specific data associated with the email message;
identifying, by the processor, a user identifier associated with the sender identifier;
generating, by the processor, a hash value of the user identifier, the global time indicator, and the message-specific data;
sending, by the processor, the hash value to the sender device, wherein the sender device includes the hash value in the email message when the email message is sent;
receiving, by the processor and from a recipient device that receives the email message, a verification package that comprises the hash value and a recipient device version of the verification data;
identifying, by the processor, a further user identifier associated with the sender identifier indicated by the recipient device version of the verification data;
generating, by the processor, a new hash value of the further user identifier, a recipient global time indicator included in the email message received by the recipient device, and recipient message-specific data included in the email message received by the recipient device; and
comparing, by the processor, the new hash value to the hash value to determine if the email message should be verified, wherein the user identifier is not known by the sender device or by the recipient device.

16. The method of claim 15, wherein the message-specific data comprises a subject line associated with the email message.

17. The method of claim 15, wherein the sender device includes the hash value in the email message when sending the email message.

18. The method of claim 15, wherein the global time indicator indicates a time at which a command to send the email message was detected by the sender device.

19. The method of claim 15, further comprising:
determining, based on the comparing, that the email message should not be verified; and
modifying a filter in response to determining that the email message should not be verified.

20. The method of claim 15, wherein the sender device adds the hash value to the email message, and wherein the global time indicator is not updated when the sender device adds the hash value to the email message.

\* \* \* \* \*